US006898377B1

(12) United States Patent
LeHoty et al.

(10) Patent No.: US 6,898,377 B1
(45) Date of Patent: May 24, 2005

(54) METHOD AND APPARATUS FOR CALIBRATION OF LIGHT-MODULATING ARRAY

(75) Inventors: David A. LeHoty, Mountain View, CA (US); Bryan Staker, Pleasanton, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 12 days.

(21) Appl. No.: 10/183,254

(22) Filed: Jun. 26, 2002

(51) Int. Cl.[7] .......................... H04J 14/02; H04J 14/08
(52) U.S. Cl. ........................... 398/87; 398/86; 398/101
(58) Field of Search ................................ 398/186, 101, 398/197, 198, 195, 52, 86, 87

(56) References Cited

U.S. PATENT DOCUMENTS

| | | | | |
|---|---|---|---|---|
| 5,381,236 | A | * | 1/1995 | Morgan ...................... 356/609 |
| 5,777,736 | A | * | 7/1998 | Horton ........................ 356/456 |
| 6,215,579 | B1 | | 4/2001 | Bloom et al. |
| 6,342,960 | B1 | * | 1/2002 | McCullough ................ 398/79 |
| 6,479,811 | B1 | * | 11/2002 | Kruschwitz et al. .... 250/237 G |

OTHER PUBLICATIONS

D.T. Amm, et al. "Grating Light Valve Technology: Update and Novel Applications" May 19, 1998, pp. 1–4, Silicon Light Machines. Presented at Society for Information Display Symposium, Anaheim, CA.

David T. Amm, et al. "Optical Performance of the Grating Light Valve Technology" 1999, pp. 1–8, Silicon Light Machines, Sunnyvale, California.

R.W. Corrigan, "An Alternative Architecture for High Performance Display" Nov. 20, 1999, pp. 1–5, Silicon Light Machines. Presented at SMPTE Technical Conference and Exhibition, New York, NY.

R.W. Corrigan, et al. "Calibration of a Scanned Linear Grating Light Valve Projection System" May 18, 1999, pp. 1–4, Silicon Light Machines. Presented at Society for Information Display Symposium, San Jose, CA.

R.W. Corrigan, et al. "Video Processing Architecture for an Electronic Cineman/Home Theater Projection Display Using the Grating Light Valve Technology" Nov. 20, 1999, pp. 1–5, Silicon Light Machines. Presented at SMPTE Technical Conference and Exhibition, New York, NY.

D.M. Bloom "The Grating Light Valve: revolutionizing display technology" pp. 1–10, Silicon Light Machines (formerly Echelle, Inc.), Sunnyvale, California.

* cited by examiner

*Primary Examiner*—M. R. Sedighian
*Assistant Examiner*—Dzung D. Tran
(74) *Attorney, Agent, or Firm*—Okamoto & Benedicto LLP

(57) ABSTRACT

One embodiment disclosed relates to a method for calibrating an array of light-modulating elements. The method includes illuminating the array of elements, modulating an intensity of light diffracted by the elements over a modulation range, and measuring the modulated light intensity from each element of the array using a linear detector. Other embodiments disclosed relate to an apparatus and system for calibrating an array of light-modulating elements. The apparatus includes a light source for illuminating the array of elements and a linear detector for measuring light intensities at points along a line segment. The apparatus is configured so that modulated light from each of the elements impinges upon a different point of the line segment. The system includes means for modulating an intensity of light diffracted by the elements over a modulation range and a detector for measuring the modulated light intensity from each element of the array.

20 Claims, 11 Drawing Sheets

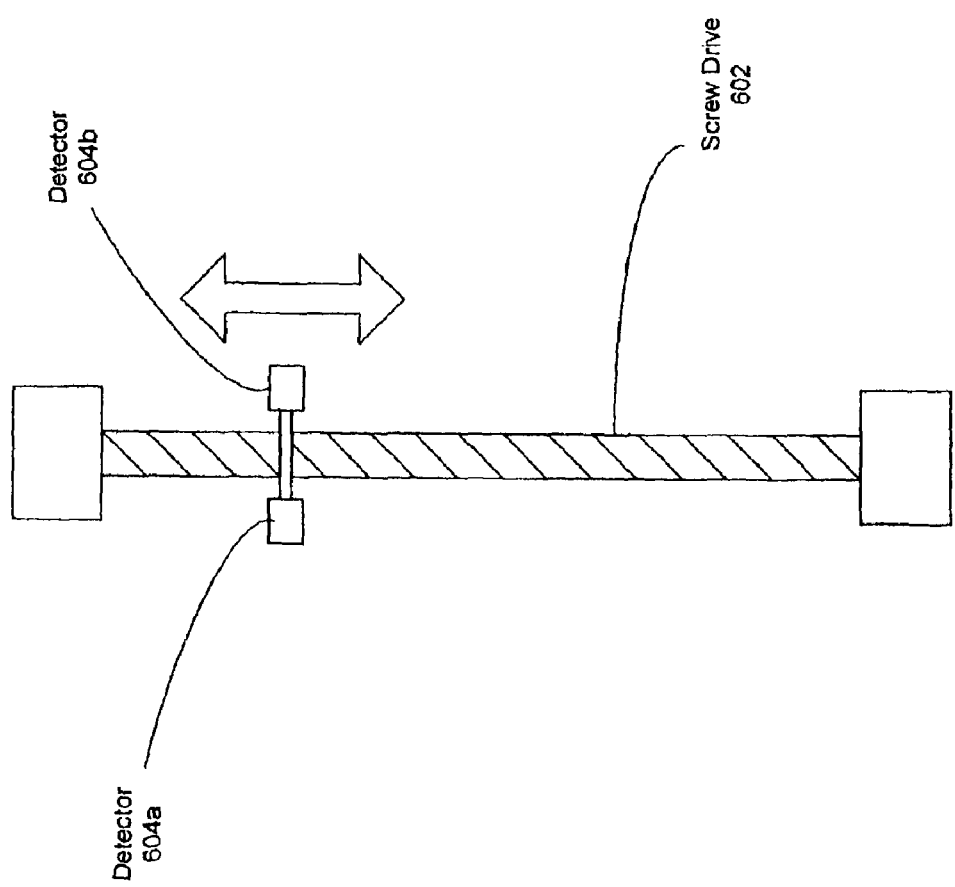

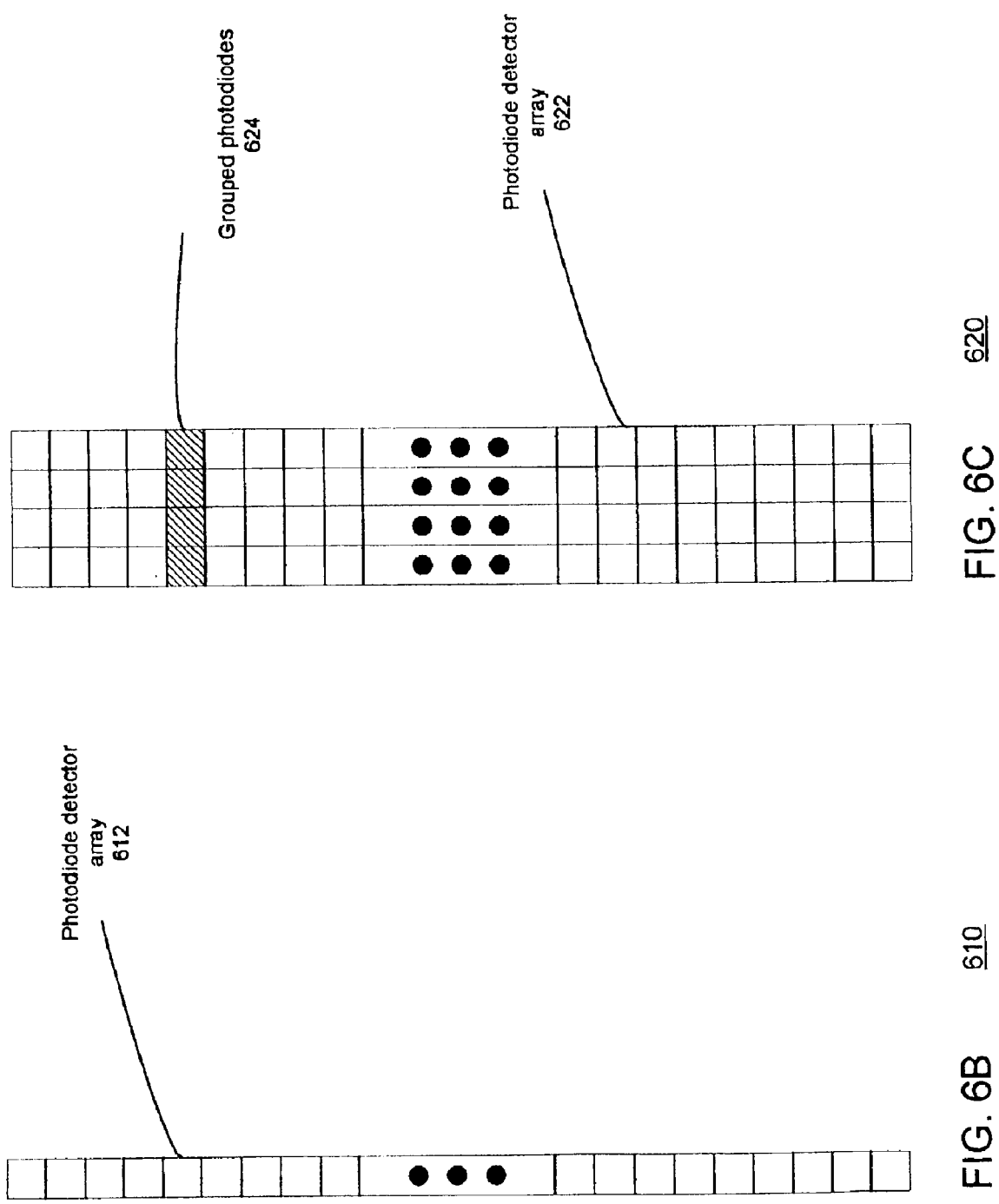

METHOD AND APPARATUS FOR CALIBRATION OF LIGHT-MODULATING ARRAY

BACKGROUND OF THE INVENTION

1. Field of the Invention

The present invention relates generally to optical systems. The present invention relates more particularly to optical systems used for projection displays communication systems.

2. Description of the Background Art

A two-dimensional projection image may be formed by using one or more linear arrays of light-modulating elements. The light-modulating elements may comprise, for example, GRATING LIGHT VALVE (GLV) elements.

Publications describing GLV devices and their application to display systems include: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

In such display systems, the linear array modulates an incident light beam to display pixels along a column (or, alternatively, a row) of the two-dimensional (2D) image. A scanning system is used to move the column across the screen such that each light-modulating element is able to generate a row of the 2D image. In this way, the entire 2D image is displayed.

FIG. 1 is a diagram depicting the reflective and diffractive operational states of a GRATING LIGHT VALVE (GLV) element. The left side of the diagram depicts the reflective (dark) state, while the right side of the diagram depicts the diffractive (bright) state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space there between. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective or dark state (left side), all the reflective members are in the same plane, and the incident light is reflected from the surfaces of the members. This reflective state may be called the dark state because it may be used to produce a dark spot (dark pixel) in a projection display system. Such a dark pixel may be produced by blocking the light that is reflected back along the same path as the incident light.

In the diffractive or bright state (right side), alternate ones of the reflective members are deflected downward. This results in the diffraction of the incident light in a direction that is at an angle to the path of the incident light. This reflective state may be called the bright state because it may be used to produce a bright spot (bright pixel) in a projection display system. Such a bright pixel may be produced because the angularly reflected light is not blocked. As discussed further below, the optical response of the element depends on the amount of downward deflection of the alternate members.

FIG. 2 is an illustration depicting a GLV element comprising pairs of fixed and movable ribbons. As depicted in FIG. 2, the GLV element may include pairs of reflective ribbons, each pair having one fixed and one movable ribbon.

FIG. 3 is a diagram depicting deflections of reflective members for a GLV element in a diffractive state. The GLV element comprises a plurality of reflective members 302. In the example illustrated, the GLV element includes three pairs of reflective members 302 (i.e. six of them).

In the diffractive state, the reflective members are controllably arranged in an alternating configuration at two heights (304 and 306). A first height 304 may correspond to reflective members at a fixed height, while the second height 306 may correspond to reflective members pulled down by application of a voltage.

The grating plane 308 is a theoretical plane that corresponds to the plane on or about which the reflective members are aligned. As illustrated in FIG. 3, the incident light beam 310 impinges upon the element at an angle perpendicular to the grating plane 308. Diffracted light 312 travels away from the element.

The difference between first and second heights may be defined as the deflection distance γ. The amount of the deflection γ may be varied by application of different voltages to control the amount of incident light reflected from the element. When γ is near zero, the element would be near a maximally reflective state. When γ is near λ/4, where λ is the wavelength of the incident light, the element would be near a maximally diffractive state.

FIG. 4 is a graph illustrating a non-linear electro-optic response for a GLV element. The graph shows intensity of light (in arbitrary units) versus voltage. The higher the voltage is, the larger is the displacement γ of the element. Depending on the voltage applied to the alternate reflective members, the light intensity varies. For the most part, the higher the applied voltage, the higher the light intensity. (This relationship reverses for sufficiently high voltages where the light intensity reduces with higher voltages, and hence the downward slope of the graph at the far right.)

One challenge to overcome in order to implement a high-performance projection display using GLV technology relates to calibration of the display system. Without calibration, the image may be non-uniform due to variations in the source illumination, the system optics, and the GLV elements.

SUMMARY

One embodiment of the invention relates to a method for calibrating an array of light-modulating elements. The method includes illuminating the array of elements, modulating an intensity of light diffracted by the elements over a modulation range, and measuring the modulated light intensity from each element of the array using a linear detector.

Another embodiment of the invention relates to an apparatus for calibrating an array of light-modulating elements. The apparatus includes a light source for illuminating the array of elements and a linear detector for measuring light intensities at points along a line segment. The apparatus is configured so that modulated light from each of the elements impinges upon a different point of the line segment.

Another embodiment of the invention relates to a system for calibrating an array of light-modulating elements. The system includes a light source for illuminating the array of elements, means for modulating an intensity of light diffracted by the elements over a modulation range, and a detector for measuring the modulated light intensity from each element of the array.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 6A depicts a linear translation stage that may be used by the linear detector in accordance with an embodiment of the invention.

FIG. 6B depicts a one-dimensional detector array that may be used by the linear detector in accordance with an embodiment of the invention.

FIG. 6C depicts a two-dimensional detector array that may be used by the linear detector in accordance with an embodiment of the invention.

The use of the same reference label in different drawings indicates the same or like components. Drawings are not to scale unless otherwise noted.

DETAILED DESCRIPTION

In order to achieve and maintain image uniformity across a projection display system utilizing light-modulating elements, the electro-optic responses for the elements need to be periodically calibrated. The present invention relates to an apparatus and method for calibrating the light-modulating elements. The elements are calibrated by processing intensities measured by a detector or detectors at various element drive levels. The calibration results enable the system to translate desired pixel intensities into corresponding drive levels for the associated light-modulating elements.

Figure 1:
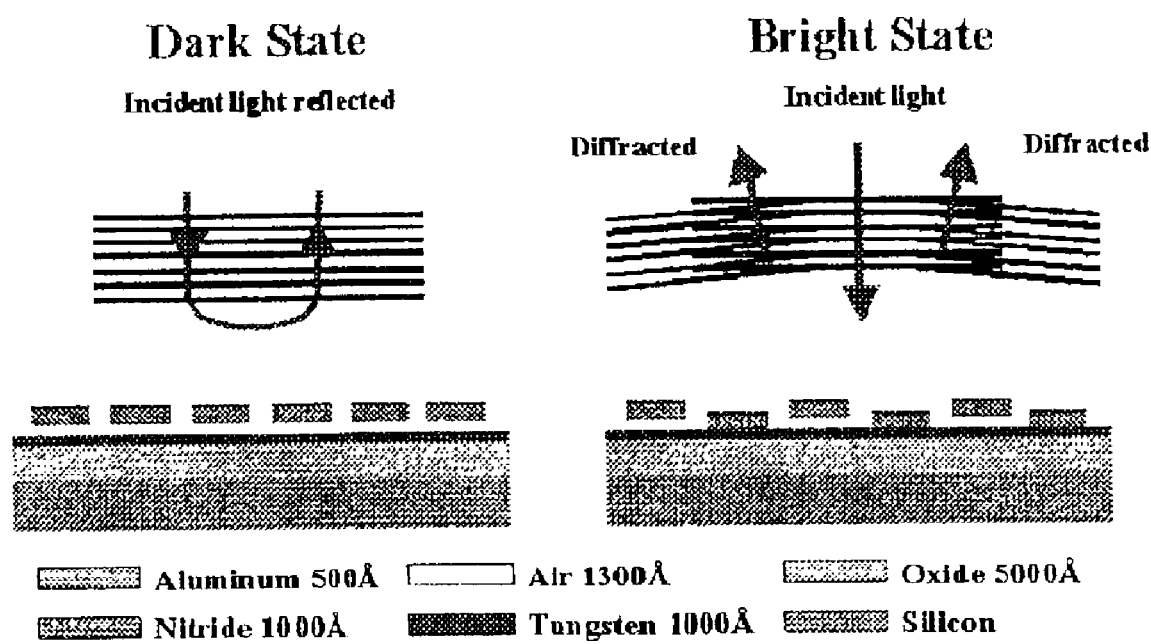
FIG. 1 is a diagram depicting the reflective and diffractive operational states of a conventional GRATING LIGHT VALVE (GLV) element.
Figure 2:
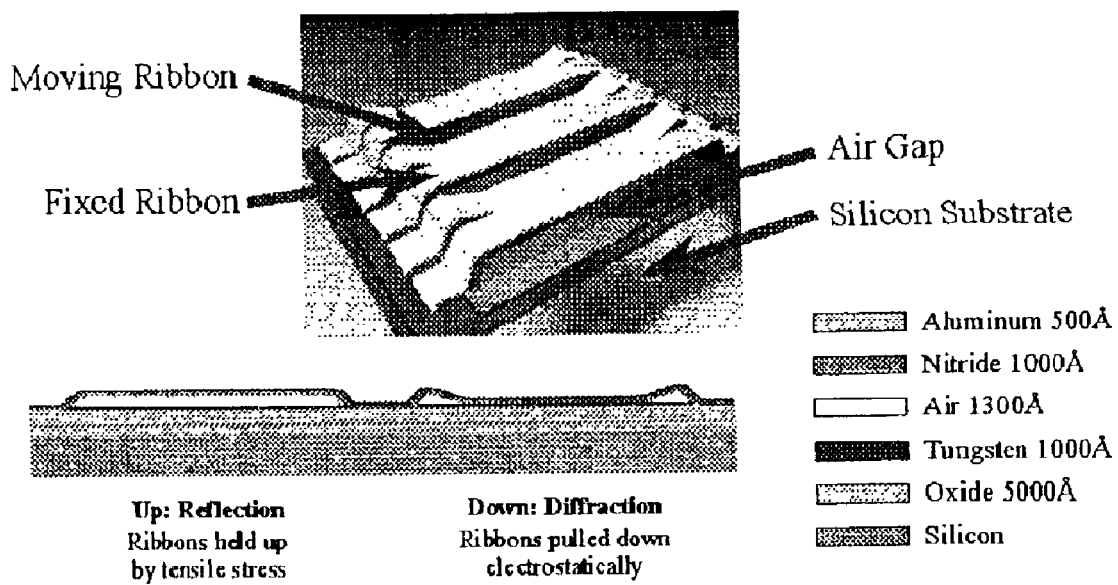
FIG. 2 is an illustration depicting a conventional GLV element comprising pairs of fixed and movable ribbons.
Figure 3:
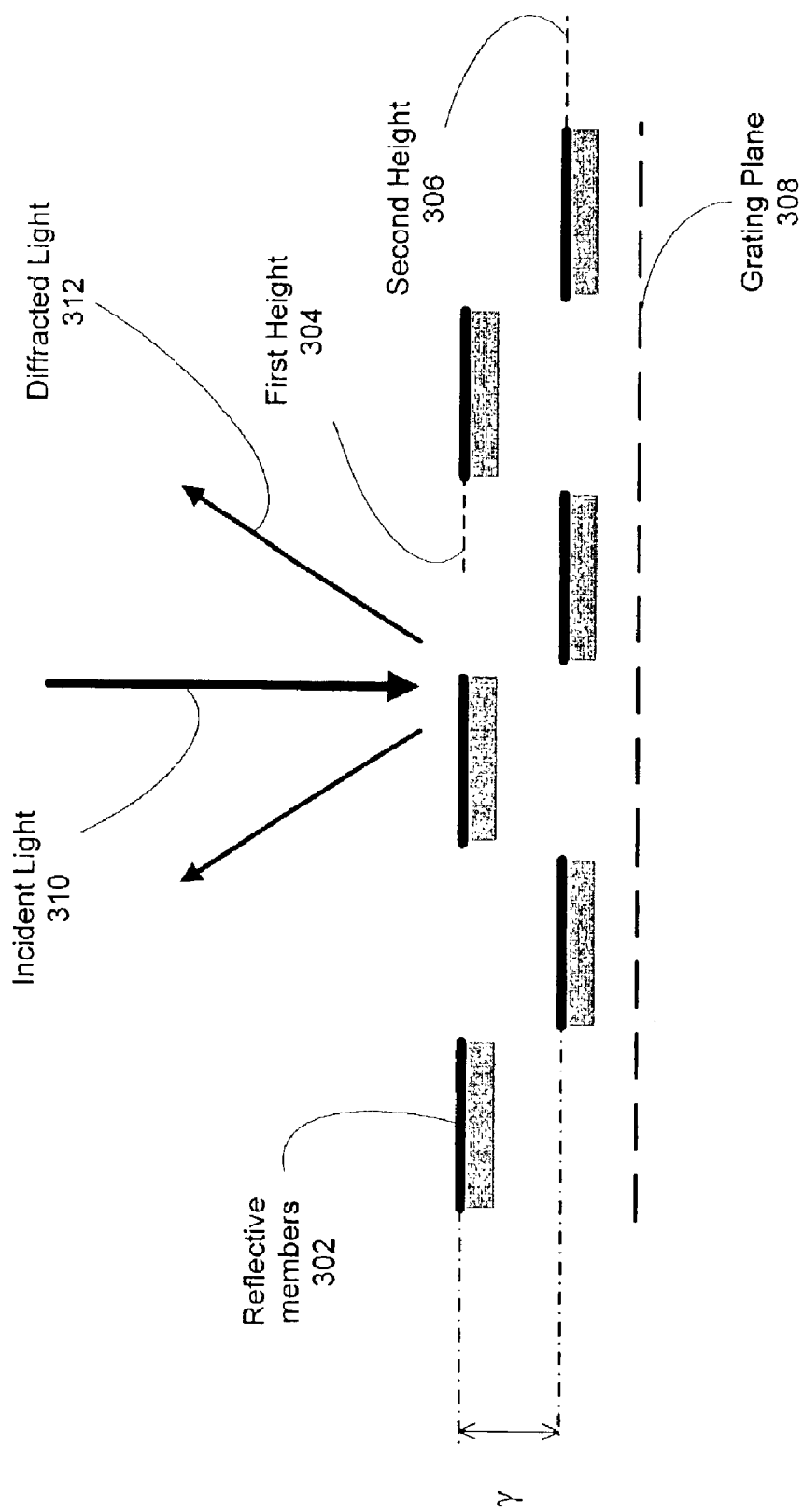
FIG. 3 is a diagram depicting deflections of reflective members for a conventional GLV element in reflective state.
Figure 4:
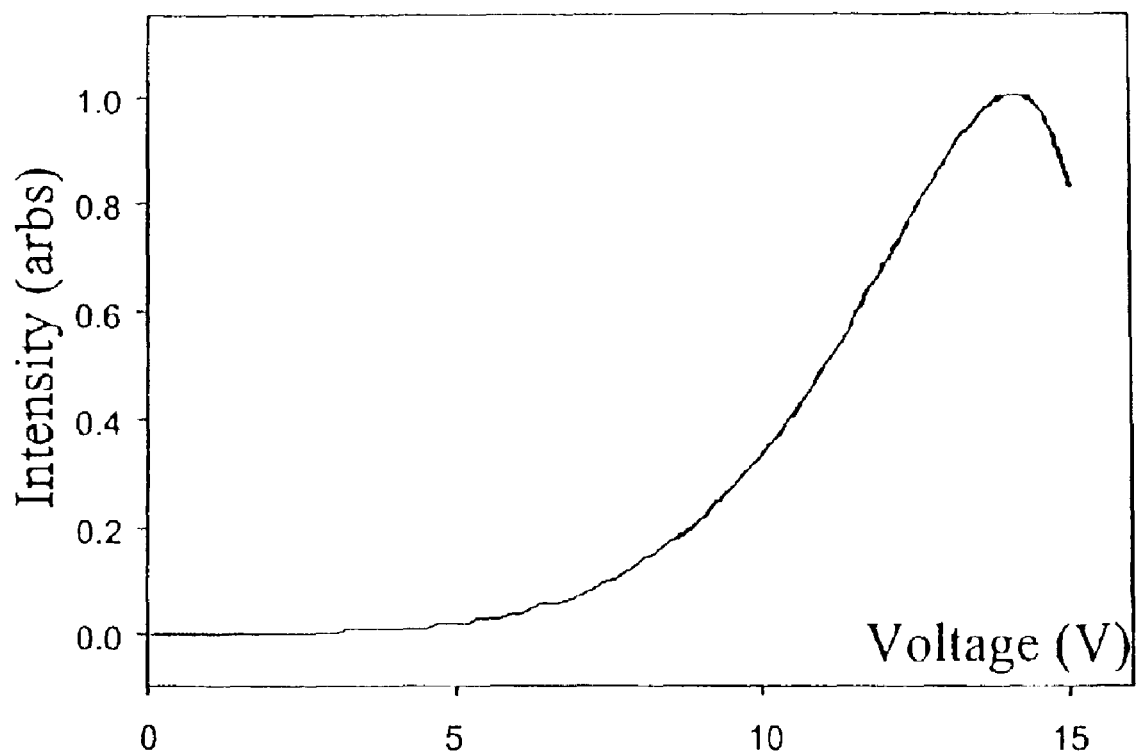
FIG. 4 is a graph illustrating a non-linear electro-optic response for a conventional GLV element.
Figure 5A:
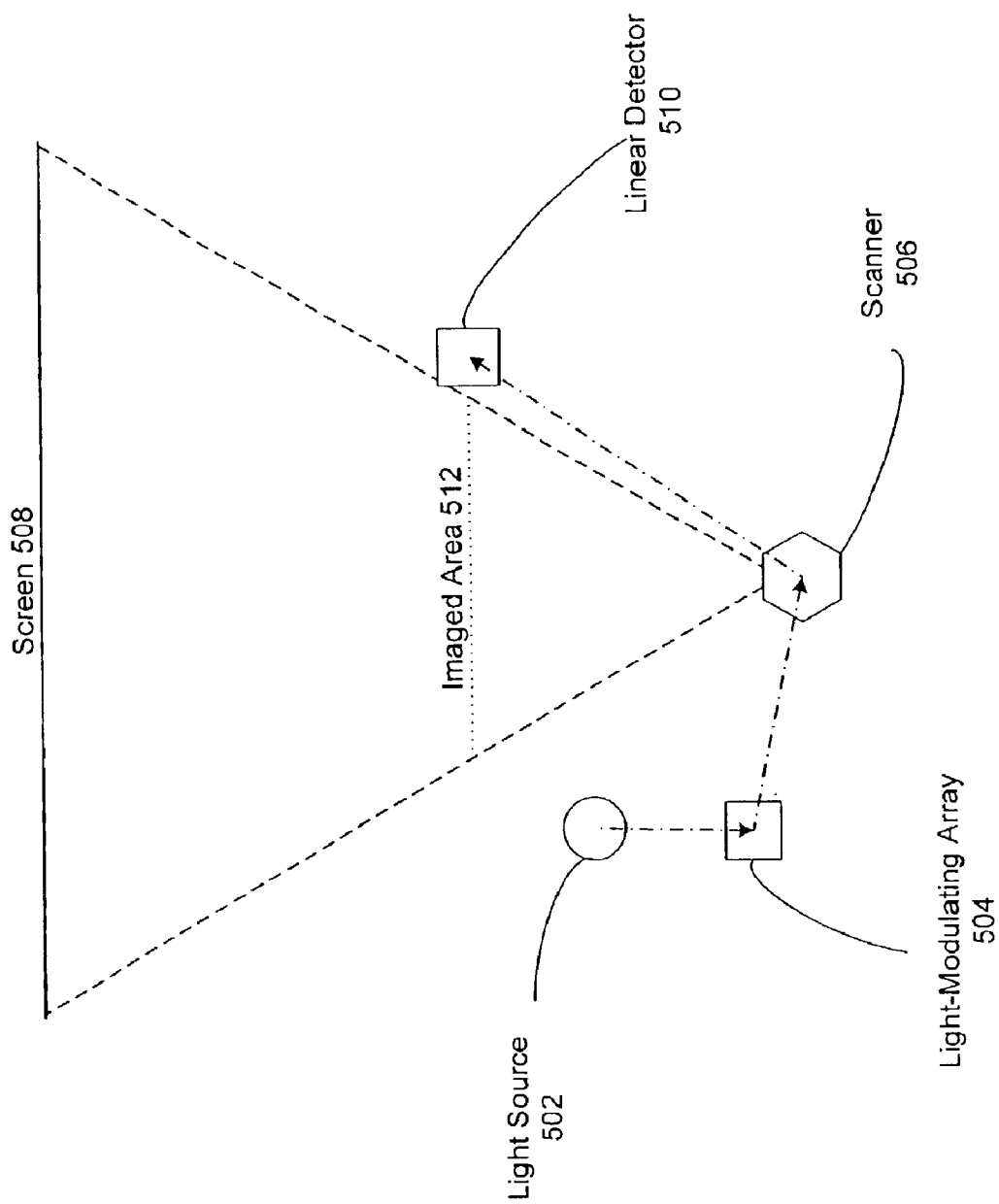
FIG. 5A is a top view depicting a projection display system including a linear detector for calibration in accordance with an embodiment of the invention.

FIG. 5A is a top view depicting a projection display system 500 including a linear detector 510 for calibration in accordance with an embodiment of the invention. The system 500 includes one or more light sources 502, one or more arrays of light-modulating elements 504, an optical scanner 506, a screen 508, and a linear detector 510.

The light source 502 may comprise one or more laser light sources. Three laser light sources of different colors may be utilized for a color display system. The light-modulating array 504 may comprise an array of GLV elements (also called GLV "pixels") described above. Each light source 502 may illuminate a light-modulating array 504. Each element of an array 504 modulates the light incident on it to control the amount of light diffracted therefrom. The diffracted light from the elements of the array 504 is then directed to the optical scanner 506.

The optical scanner 506 is used to move the column (or row) of light across the screen 508. Various types of scanners 506 may be used. For example, galvonometer-based scanners, resonant scanners, polygon scanners, rotating prisms, or other types of scanners may be used. A drive signal is applied to the scanner to control ("drive") the movement of the column (or row) of light. For example, to achieve a progressive scan of the column across the screen (e.g., from left to right), a sawtooth drive signal may be used.

In accordance with an embodiment of the present invention, the drive signal is modified such that the scanner 506 moves the column of light beyond the screen 508 to the linear detector 510. The calibration occurs when the column of light impinges upon the linear detector 510. Example embodiments of the linear detector 510 are described below in relation to FIGS. 6A, 6B, and 6C. In accordance with an embodiment of the invention, the linear detector 510 is internal to a cabinet enclosing the light source 502, array 504, and scanner 506 of the projection display system 500. Alternatively, the linear detector 510 may be external. Such an external linear detector would be of a larger physical size than an internal linear detector (all else being equal). The internal linear detector would advantageously be hidden from view.

Figure 5B:
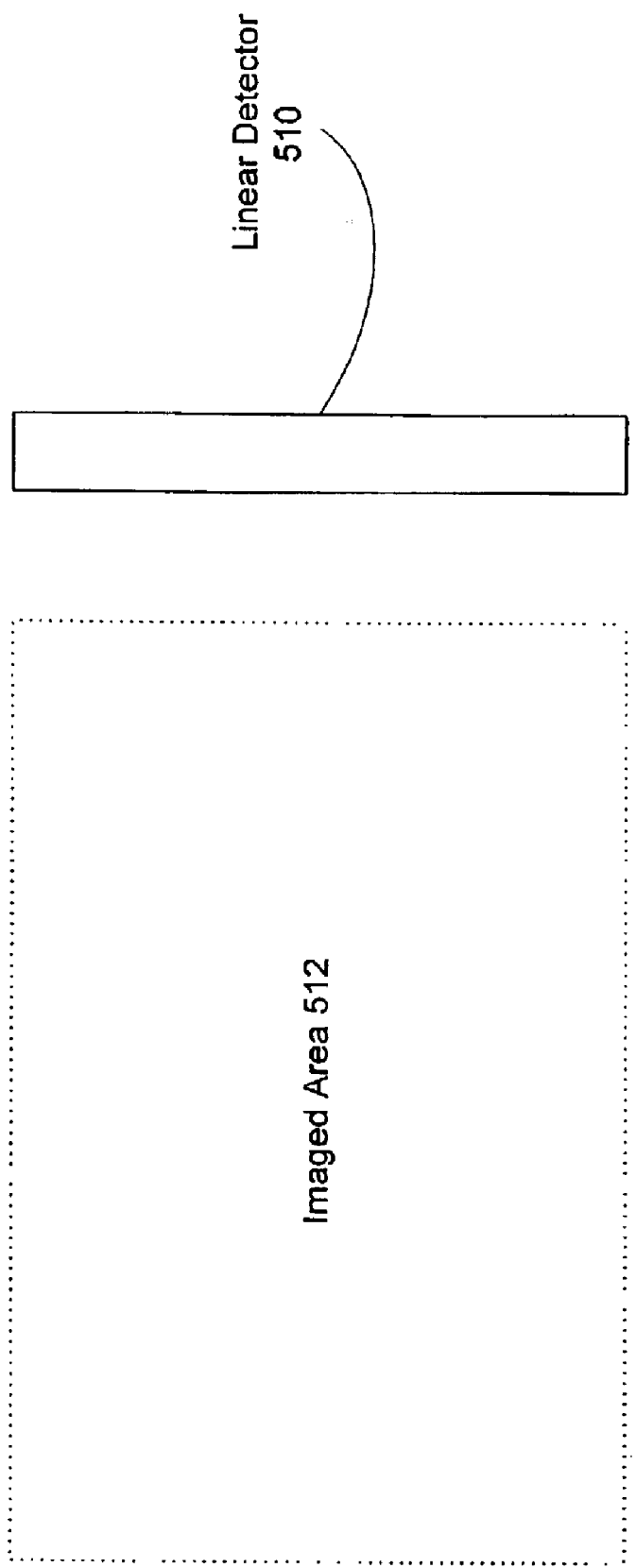
FIG. 5B is a side view depicting the linear detector in relation to a imaged area in accordance with an embodiment of the invention.

A conceptual imaged area 512 that is parallel to the screen 508 and lies in the same plane as the linear detector 510 is also depicted in FIG. 5A. This imaged area 512 corresponds to the area in that plane which is scanned by the system 500 to produce the video image. FIG. 5B is a side view depicting the linear detector 510 in relation to the imaged area 512 in accordance with an embodiment of the invention. As illustrated by FIG. 5B, the linear detector 510 is outside the imaged area 512.

FIG. 6A depicts a linear translation stage 600 that may be used by the linear detector 510 in accordance with an embodiment of the invention. The mechanism for the linear translation stage 600 may comprise, for example, a screw drive mechanism 602. The mechanism 602 operates to move the detector device(s) 604 up and down along the linear direction of the linear detector 600. The linear detector 600 detects light from different elements of the light-modulating array 504 depending on the position of the detecting device (s) 604. Each detector device 604 may include, for example, a photodiode or other light detection device.

In one specific embodiment, one detector device 604 may be used. In the specific embodiment shown in FIG. 6A, two detector devices 604a and 604b are translated together. Two or more detector devices 604 may be used to increase the dynamic range of the detection. For example, a first detector device 604a may have a dynamic range covering lower light intensities and a second detector device 604b may have a dynamic range covering higher light intensities. Data from the first detector device 604a may then be used for element modulations that result in lower light intensities, while data from the second detector device 604b may then be used for element modulations that result in higher light intensities. In this way, the two devices 604a and 604b may provide a greater dynamic range for the detection. Similarly, more than two devices 604 may be used to further increase the dynamic range of the light detection.

FIG. 6B depicts a one-dimensional detector array 610 that may be used by the linear detector 510 in accordance with an embodiment of the invention. The one-dimensional detector array 610 may comprise, for example, an array of photodiodes 612. In one embodiment, for example, the array 612 may include about one thousand photodiode devices. Of course, in other embodiments, less or more than one thousand such devices may be used. Advantageously, calibration may be performed more rapidly with the detector array 610 in comparison to the linear translatable detector 600 of FIG. 6A.

FIG. 6C depicts a two-dimensional detector array 620 that may be used by the linear detector 510 in accordance with an embodiment of the invention. The two-dimensional (2D) detector array 620 may comprise, for example, a 2D array of photodiodes 622. In one embodiment, for example, the array 622 may include about one thousand rows of photodiode devices. Of course, in other embodiments, less or more than one thousand rows may be used. Each row may include several photodiode devices.

In one implementation, photodiodes in a same row of the two-dimensional array are grouped together (see grouped photodiodes 624 in FIG. 6C). The light detected by the photodiodes in the group may be counted together. In this way, each group 624 acts similarly as an individual photodiode in the one-dimensional array 612. Advantageously, a two-dimensional detector array 620 may provide a wider target (and hence a greater tolerance for error in aim) when the modulated light from the modulation array 504 is directed to it.

Figure 7:
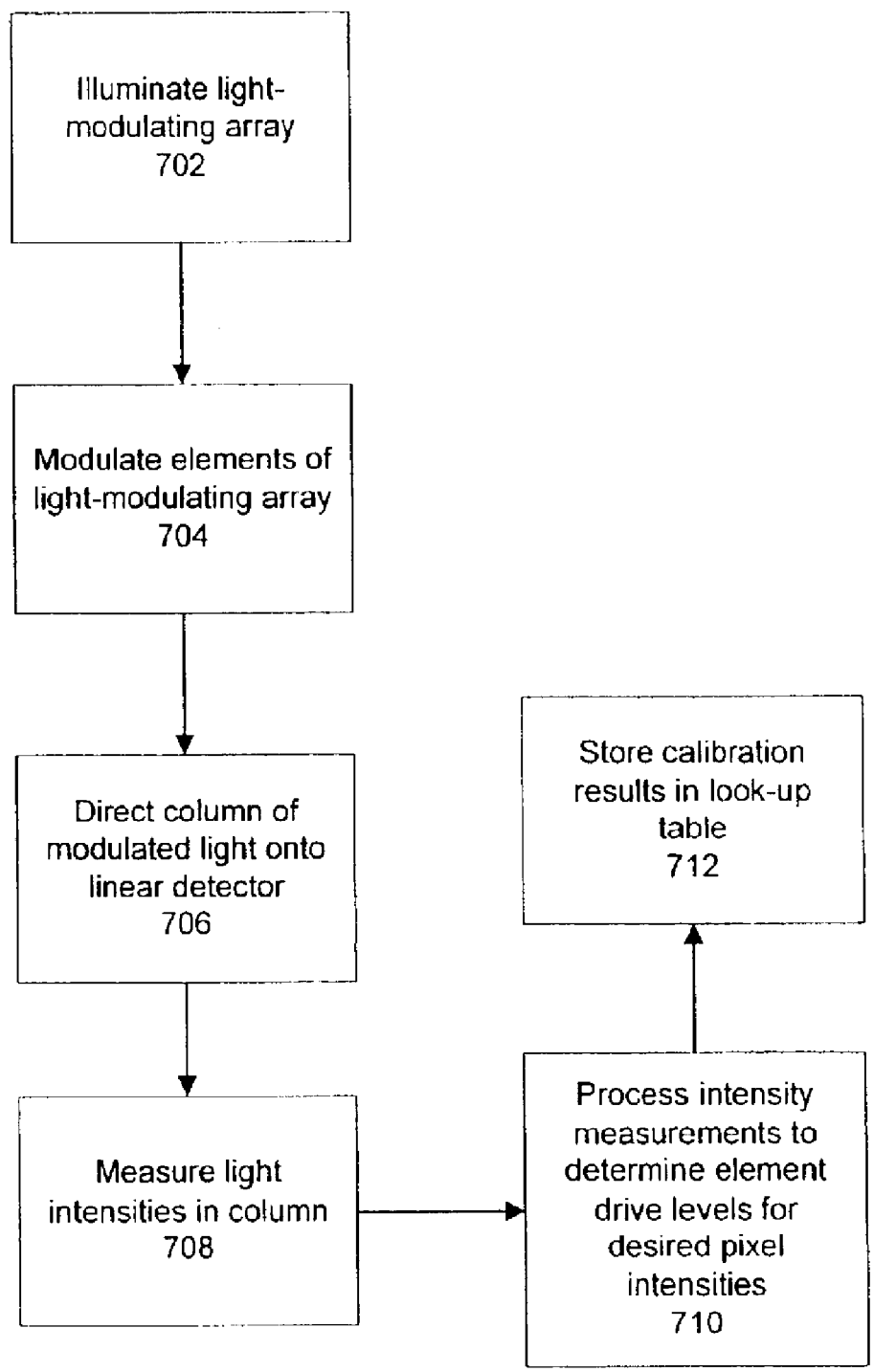
FIG. 7 is a flow chart depicting a method for calibrating an array of light-modulating elements in a system in accordance with an embodiment of the invention.

FIG. 7 is a flow chart depicting a method 700 for calibrating an array of light-modulating elements 504 in a system in accordance with an embodiment of the invention. The method 700 as depicted includes six steps (702, 704, 706, 708, 710, and 712).

In the first step 702, the array 504 of light-modulating elements is illuminated by the light source 502. As discussed above, a system may include multiple light sources 502 and multiple light-modulating arrays 504, each of which may need calibration.

In the second step 704, the elements of the light-modulating array 504 are modulated. The modulation involves varying the drive level of each element so that the element diffracts various amounts of light. An example of a process 800 for the modulation 704 of the array 504 is described below in relation to FIG. 8.

In the third step 706, the modulated light from the array 504 is directed onto a linear detector 510. This step 706 may be accomplished by using an optical scanner 506. For example, as described above in relation to FIGS. 5A and 5B, the scanner 506 may direct the modulated light to a linear detector 510 that is positioned outside of the imaged area 512.

In the fourth step 708, light intensities in the column of modulated light are measured. As described above, the light intensities may be measured using a linear detector 510. The linear detector 510 may comprise, for example, a linear translatable stage 600 (FIG. 6A), a one-dimensional array 610 (FIG. 6B), or a two-dimensional array 620 (FIG. 6C). Alternatively, a point detector (for example, an integrating sphere or half-sphere) may be used in this step 706. However, such a point detector, while perhaps less costly, may also be less accurate and/or less efficient compared with a linear detector.

In the fifth step 710, the intensity measurements are processed. For each element, the drive levels corresponding to desired pixel intensities may differ. The processing determines the drive levels per element that correspond to desired pixel intensities.

In the sixth step 712, the calibration results are stored to be used by the system. In accordance with one embodiment, the results are stored in a look-up table. The look-up table provides per element, the appropriate drive levels to achieve various desired pixel intensities. The look-up table may thus include the following data fields.

| element ID | pixel intensity | voltage level |
| --- | --- | --- |

Figure 8:
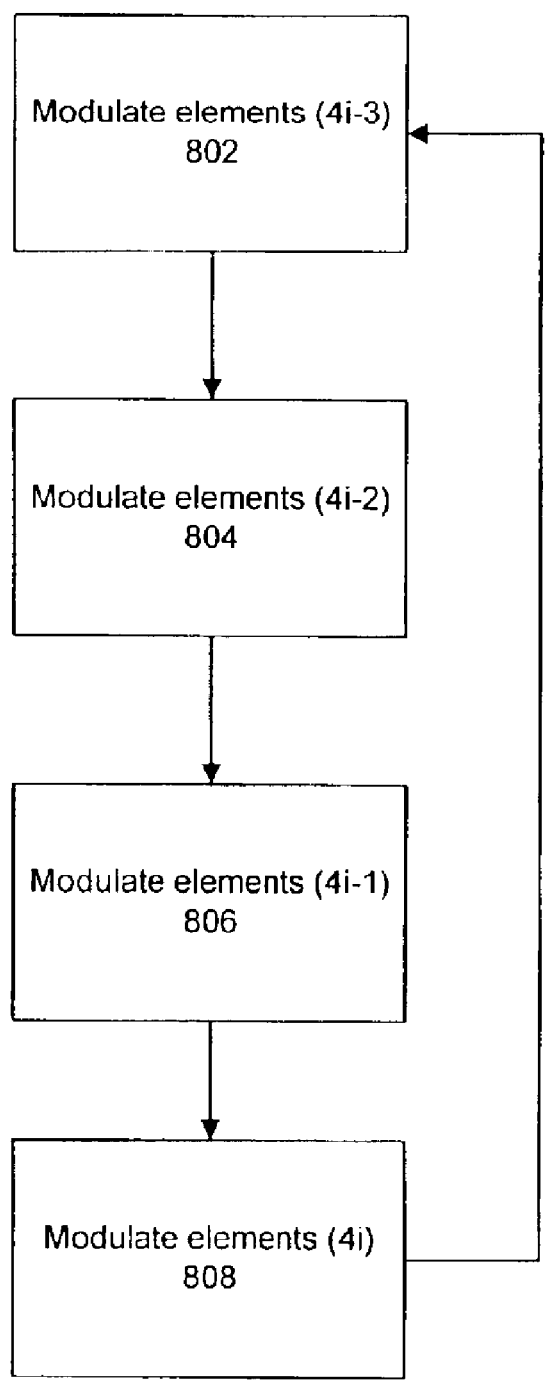
FIG. 8 is a flow chart depicting an example process for modulation of an array in accordance with an embodiment of the invention.

FIG. 8 is a flow chart depicting an example process 800 for modulation 704 of an array in accordance with an embodiment of the invention. The method 800 as depicted includes four steps (802, 804, 806, and 808).

In the first step 802, a first set of every nth element, where n=4, is modulated while the elements in between are kept dark. The every fourth element in the first set may be represented by (4i−3) where i=1, 2, 3, etc. The modulation may be at various voltage levels in order to provide sufficient data for the processing 710 to calibrate each of these elements.

In the second step 804, a second set of every nth element, where n=4, is modulated while the elements in between are kept dark. The every fourth element in the second set may be represented by (4i−2) where i=1, 2, 3, etc. The modulation may be at various voltage levels in order to provide sufficient data for the processing 710 to calibrate each of these elements.

In the third step 806, a third set of every nth element, where n=4, is modulated while the elements in between are kept dark. The every fourth element in the second set may be represented by (4i−1) where i=1, 2, 3, etc. The modulation may be at various voltage levels in order to provide sufficient data for the processing 710 to calibrate each of these elements.

In the fourth step 808, a fourth set of every nth element, where n=4, is modulated while the elements in between are kept dark. The every fourth element in the second set may be represented by 4i where i=1, 2, 3, etc. The modulation may be at various voltage levels in order to provide sufficient data for the processing 710 to calibrate each of these elements. After the fourth step 808, the process 800 may loop back and perform the first step 802.

Of course, while n=4 in the example depicted in FIG. 8, n may be other positive integers (1, 2, 3, 5, 6, 7, etc.). In accordance with one embodiment, the various voltage levels tested during the modulation may be the same for each of the n sets. Advantageously, modulating only every nth element at a same time (and keeping the elements in between dark) provides a separation between the active pixels during the calibration. The separation isolates the intensity data collected per element from potential interference from neighboring elements.

In one embodiment, the modulation may be repeated a plurality of times at each step (802, 804, 806, or 808) before going on to the next step. Such repeating advantageously allows the processing 710 to select and use the peak or best data for a more accurate calibration.

Figure 9:
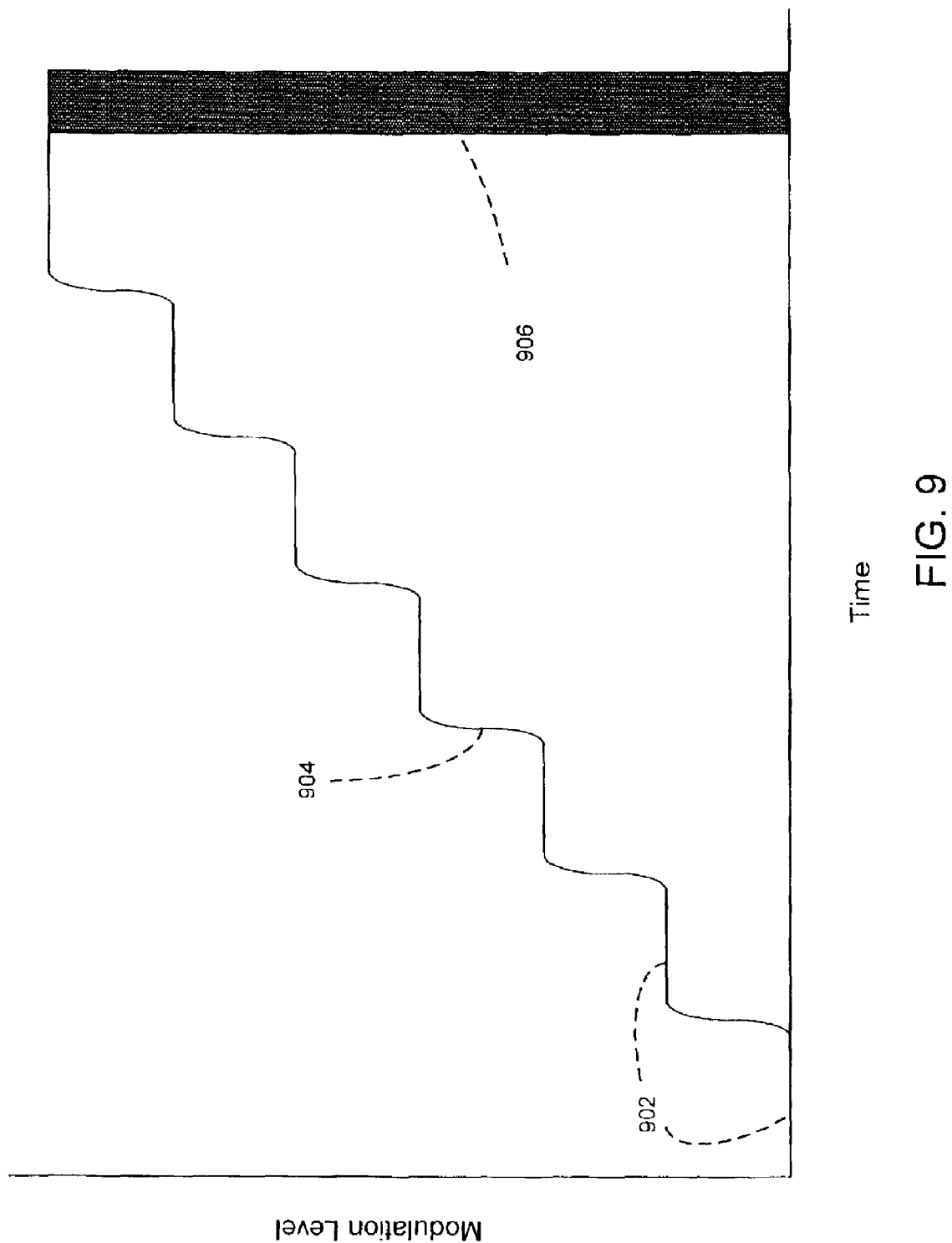
FIG. 9 is a graph depicting an example modulation of an element for calibration purposes in accordance with an embodiment of the invention.

FIG. 9 is a graph depicting an example modulation of an element for calibration purposes in accordance with an embodiment of the invention. The graph shows modulation (voltage) level versus time for the example modulation. Light intensity data is collected during the steady (flat) portions of the modulation (the calibration levels) 902. In between the calibration levels 902, the modulation level changes 904. Light intensities during these changes are not used for calibration purposes.

In accordance with one embodiment of the invention, an identifying marker or tag (ID tag) 906 is added that is unique for each element. The ID tag may be used to correlate the light intensity data to the element modulated to produce the data. While the ID tag 906 is shown appended at the end of the modulation in FIG. 9, the ID tag 906 may alternatively be at the beginning (or in the middle) of the modulation. Each ID tag 906 may comprise, for example, a unique series of bits. The modulation level being either high or low may represent the bits.

The examples described above may be considered as using time division multiplexing by modulating and collecting data from different elements at different times. Other embodiments of the invention may utilize code division multiplexing. Using code division multiplexing would allow combined data from a plurality of elements to be detected at once. Using code division multiplexing, the data per element may subsequently be extracted from the combined data. Code division multiplexing may be advantageous in that a higher signal-to-noise ratio for a measurement may be achievable over a comparable period of time. In other words, faster measurements at a comparable signal-to-noise ratio may be achieved. In addition, in cases where the linear detector array has fewer elements than the number of elements in the light-modulating array to be calibrated, the linear detector array may be used more efficiently with code division multiplexing.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for calibrating an array of light-modulating elements, the method comprising:

illuminating the array of elements;

scanning a diffracted beam of light from the array across a rectangular area;

upon completion of a scan over the rectangular area, directing the diffracted beam to a separate linear detector configured adjacent to said rectangular area;

during times when the diffracted light is directed at the linear detector, modulating the elements over a modulation range causing corresponding modulation of diffracted light intensities;

measuring the modulated diffracted light intensities using the linear detector; and processing the measurements to estimate voltage levels corresponding to light intensity levels for the elements.

2. The method of claim 1, wherein the measuring comprises physically moving an intensity-detecting device of the linear detector to measure the modulated light intensity from each element of the array.

3. The method of claim 2, wherein at least two intensity-detecting devices, a first device with a first dynamic range covering lower light intensities and a second device with a second dynamic range covering higher light intensities, are utilized to improve a signal-to-noise ratio.

4. The method of claim 1, wherein the measuring is performed before an image plane of the projection display.

5. The method of claim 4, wherein the measuring is performed during operation of a projection display to calibrate the array of elements without interrupting viewing of video content on the display.

6. The method of claim 1, wherein the array of elements is subdivided into n sets, wherein n is an integer greater than one, wherein each set comprises every nth element, and wherein elements in one set are modulated at once while elements in remaining sets are in a dark state so as to provide separation between active pixels during calibration.

7. The method of claim 1, wherein an identifying marker comprising a unique series of bits is applied to data from an element by distinctive modulation of the element.

8. The method of claim 1, wherein a modulation function applied to an element is repeated a plurality of times during data collection for the element, and wherein only select peak data from the collected data are used for the calibration of the element.

9. The method of claim 1, wherein combined data from a plurality of elements is detected at once, and code division multiplexing is applied so that data per element may be extracted from the combined data.

10. An apparatus for calibrating an array of light-modulating elements, the apparatus comprising:

a light source for illuminating the array of elements; and a scanner configured to scan a diffracted beam from the array over a rectangular area;

a rectangular screen configured to receive the scanned diffracted beam and to display an image formed thereby; and a linear detector configured to receive the diffracted beam and to measure light intensities at points along a line segment;

wherein the linear detector is positioned adjacent to the rectangular area; and wherein the scanner is further configured, upon completion of a scan over the rectangular area, to direct the diffracted beam to the linear detector.

11. The apparatus of claim 10, wherein the linear detector comprises a screw drive to position an intensity-detecting device.

12. The apparatus of claim 11, wherein at least two intensity-detecting devices, a first device with a first dynamic range covering lower light intensities and a second device with a second dynamic range covering higher light intensities, are utilized to improve signal-to-noise ratios of the light intensity measurements.

13. The apparatus of claim 10, wherein the linear detector comprises a linear array of intensity-detecting devices.

14. The apparatus of claim 13, wherein the linear array comprises a two-dimensional array of detecting devices that is configured to function as a one-dimensional array for detection purposes.

15. The apparatus of claim 10, wherein the apparatus is configured so that the linear detector is placed before an image plane of the projection display.

16. The apparatus of claim 10, wherein the array of elements is subdivided into n sets, wherein n is an integer greater than one, wherein each set comprises every nth element, and wherein elements in one set are modulated at once while elements in remaining sets are in a dark state so as to provide separation between active pixels during calibration.

17. The apparatus of claim 10, wherein an identifying marker comprising a unique series of bits is applied to data from an element by distinctive modulation of the element.

18. The apparatus of claim 10, wherein a modulation function applied to an element is repeated a plurality of times during data collection for the element, and wherein only select peak data from the collected data are used for the calibration of the element.

19. The apparatus of claim 10, wherein combined data from a plurality of elements is detected at once, and code division multiplexing is applied so that data per element may be extracted from the combined data.

20. A system for calibrating an array of light-modulating elements, the system comprising:

a light source for illuminating the array of elements;

a scanner configured to scan a diffracted beam of light from the array across a rectangular area;

a linear detector configured adjacent to said rectangular area:

means for modulating the elements over a modulation range during times when the diffracted light is directed at the linear detector so as to cause corresponding modulation of diffracted light intensities;

wherein the scanner is further configured, upon completion of a scan over the rectangular area, to direct the diffracted beam to the linear detector.

* * * * *